March 24, 1964

C. P. CHRISTMAN 3,126,185

CABLE CLIP MEANS

Filed Oct. 16, 1961

INVENTOR.
Charles P. Christman
BY
His Attorney

March 24, 1964     C. P. CHRISTMAN     3,126,185
CABLE CLIP MEANS
Filed Oct. 16, 1961     2 Sheets-Sheet 2
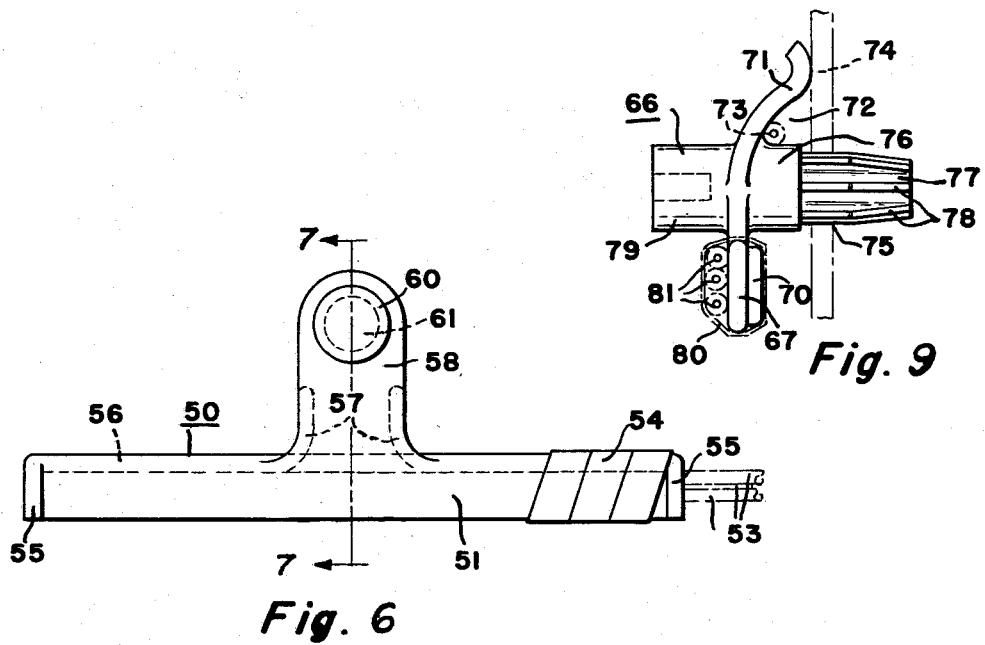
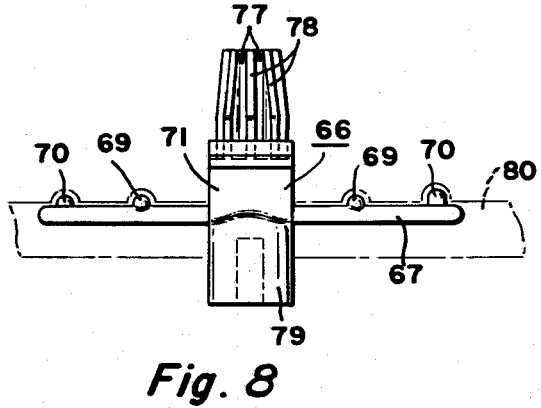
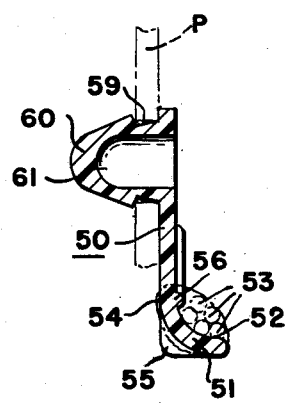
INVENTOR.
Charles P. Christman
BY
*Albert H. Reuther*
His Attorney United States Patent Office 3,126,185
Patented Mar. 24, 1964

3,126,185
CABLE CLIP MEANS
Charles P. Christman, Warren, Ohio, assignor to General Motors Corporation, Detroit, Mich., a corporation of Delaware
Filed Oct. 16, 1961, Ser. No. 145,358
6 Claims. (Cl. 248—74)

This invention relates to conductor mountings and, more particularly, to a cable mounting clip means made entirely of plastic material to fit an apertured mounting panel.

An object of this invention is to provide a new and improved cable clip means made entirely of plastic material and adapted to complement longitudinally extending conductors or cable subject to transverse latching by the clip means free of any tape, covering and the like.

Another object of this invention is to provide an all-plastic cable mounting clip means having a longitudinally extending semi-arcuate trough-like body portion having a barbed mounting lug means integral therewith to fit a mounting panel aperture and further means integral with said body portion for holding cable conductor means in a predetermined position.

A further object of this invention is to provide an all-plastic cable mounting clip means having a longitudinally extending semi-arcuate body portion including an extension to one side with transverse gripping rib means thereon as well as barbed mounting lug means to fit a mounting panel aperture and located adjacent to a transverse hinge portion movable into a position diametrically across the semi-arcuate body portion for holding single and possibly multiple wires thereto free of any tape covering while the extension can be freely used for handling purposes during installation and removal of the clip means.

Another object of this invention is to provide an all-plastic cable mounting clip means having a semi-arcuate body portion including an extension for handling to one side as well as barbed mounting lug means to fit a mounting panel aperture and located laterally adjacent to a transverse hinge portion reduced in thickness in part for bending and having an intermediate thicker abutment to engage a conductor means held against inner periphery of the semi-arcuate body portion as the hinge portion is latched therewith.

Further objects and advantages of the present invention will be apparent from the following description, reference being had to the accompanying drawings wherein preferred embodiments of the present invention are clearly shown.

In the drawings:

FIGURE 6 is a side view of another embodiment of wiring harness clip means.

FIGURE 7 is a cross-sectioned elevational view taken along line 7—7 in FIGURE 6.

FIGURE 8 is a plan view of a modification of wiring harness clip means for holding both single and multiple conductors.

FIGURE 9 is an end view of the clip means of FIGURE 11.

Figure 1:
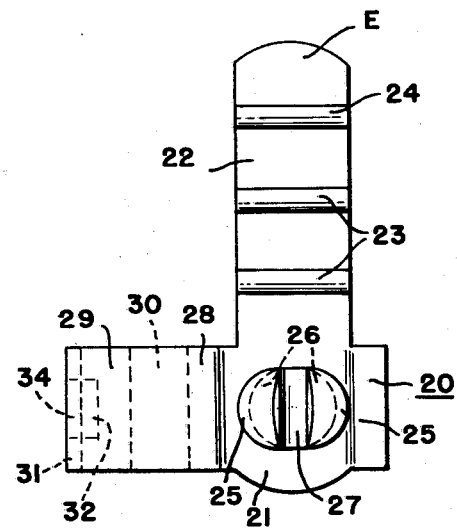
FIGURE 1 is an open plan view of a cable clip means of moldable plastic material and having features in accordance with the present invention.
Figure 3:
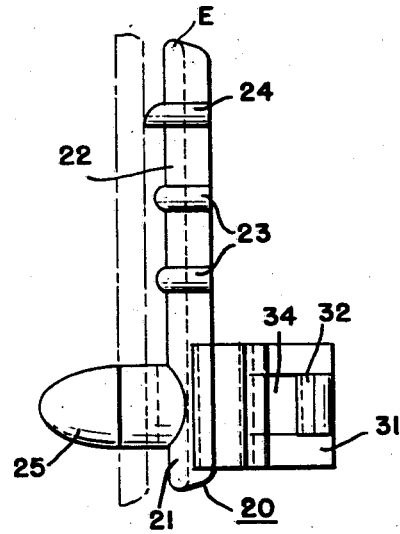
FIGURES 2 and 3 are end and side views, respectively, of the plastic clip means of FIGURE 1.
Figure 5:
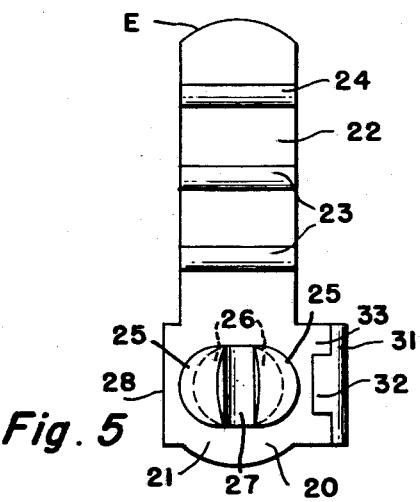
FIGURES 4 and 5 are closed plan and end views of clip means corresponding to views of FIGURES 1 and 2, respectively.
Figure 2:
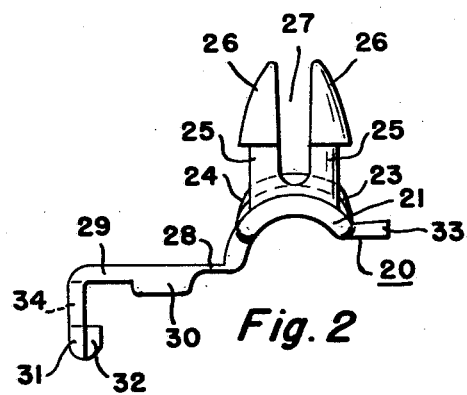
Figure 4:
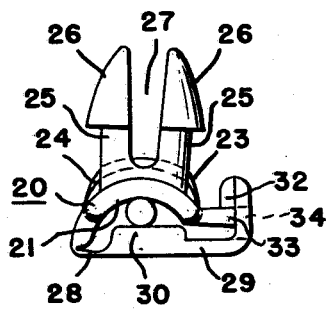

FIGURES 1 through 5 illustrate a cable clip means generally indicated by numeral 20 and made in one piece of moldable plastic material such as polypropylene and the like to have features in accordance with the present invention. Views of FIGURES 1 through 3 illustrate the clip means 20 as molded in an open condition and views of FIGURES 4 and 5 illustrate the clip means 20 in a folded or closed condition. The clip means includes a primary body portion 21 crescent-shaped or recessed on one side to be semi-arcuate in cross section including a longitudinally extending extension 22 also recessed along one side thereof to be semi-arcuate in cross section and provided with a pair of transverse ribs 23 as well as an end rib 24 of greater height than the ribs 23. These ribs 23—24 integral with the extension 22 are provided for gripping and handling of the clip means 20 during installation thereof free of any tape-like wrapping or covering such as disclosed in Patent 2,931,851—Sims belonging to the assignee of the present invention. The extension 22 can be freely used during installation and removal of the clip means and recessing along an underside thereof can permit contour fit of both the body portion 21 and extension along a rounded periphery of conductors, wiring, tubing and the like.

The body portion 21 and extension 22 with the semi-arcuate shape visible in FIGURES 2 and 4 can include a concave surface extending longitudinally therebetween where recessed and a convex surface substantially continuous except for the ribs 23—24. Projecting radially outwardly from the convex surface of the body portion 21 there can be mounting means including a pair of semi-arcuate shanks 25 each having semi-conical or tapered barbed lug means 26 integral therewith and adapted to be fitted through an aperture of a mounting panel such that semi-arcuate abutting edges of the lug means 26 engage one side or edge of an aperture of the panel and the convex surface of the body portion and extension at least in part can engage an opposite side of the panel except where outer peripheral edges of the ribs 23—24 abut laterally against such a mounting panel as outlined in FIGURE 3. Provision of the ribs 23—24 assures that a free end E of the extension is spaced a predetermined distance away from a side of the mounting panel and can be engaged by a tool means or fingers for access and handling of the clip means 20 during installation and removal thereof on one side of the apertured panel. A slot or tapered recess 27 extending diametrically between the lug means 26 and shanks 25 can add radial resilience thereto to facilitate installation and removal of the mounting means and this slot 27 is preferably in alignment with the longitudinal recessing shared by the body portion 21 and extension 22 all the way to the free end E of the latter.

A reduced thickness web-like hinge means 28 is provided integrally between the primary body portion 21 and a secondary or hinged body portion 29 that carries a substantially rectangular-shaped abutment 30 thicker in cross section than the hinged body portion 29 and adapted to project into the semi-arcuate longitudinally extending recessing along the concave side of the body portion 21. The hinged body portion 29 includes a U-shaped extension 31 providing a generally L-shape therewith and carrying an integral lug or latching projection 32 that fits complementary to a latching flange 33 projecting from the body portion 21 in a direction opposite to that of the side on which the hinge means 28 is integrally provided. This latching flange 33 is engageable by the lug or latching projection 32 as illustrated in views of FIGURES 4 and 5. The U-shaped projection or extension 31 provides a passage or an opening 34 therethrough to accommodate and increase flexibility of the extension 31. The passage or opening is represented by numeral 34 and can be seen directly or indirectly in views of FIGURES 1, 2, 3 and 4. In FIGURE 4 there is an outline of a single conduit or conductor maintained against sliding longitudinally in the recessing shared by the body portion 21 and extension 22 and it is apparent that the hinged portion 29 is movable substantially tranversely to any such wiring, conductors or conduits to be positioned adjacent to an apertured mounting panel by clip means 20 in accordance with the present invention. Use of expensive taping operations for only single or dual conductors or leads is unnecessary with the clip means 20 and spacing from the mounting panel on one side thereof is maintained by the ribs 23—24 as indicated earlier. It is possible for the clip means 20 to be attached to the conductors or wires in proper locations by wire assembly manufacturers and then the wiring harness so prepared can be readily assembled to a motor vehicle body panel having an aperture therein merely by pushing the clip means into the hole or aperture that can be stamped in a predetermined location of a sheet metal vehicle body panel, for example.

FIGURES 6 and 7 illustrate another embodiment of wiring harness clip means generally indicated by numeral 50 and having a substantially longitudinally extending body portion 51 curved in part to provide a recess 52 into which one or more conductors 53 can be fitted and held by a wrapping 54 as outlined in the drawings. There are flanges 55 immediately adjacent to each of the opposite ends of the longitudinally extending body portion 51 and these flanges serve as a limit or stop for the wrapping of tape and the like indicated by numeral 54. Also, a longitudinally extending rib means 56 including a pair of lateral extensions 57 thereof assure retention of the conductors or wiring 53 in the concavely recessed portion 52. These extensions 57 are integral with a lateral projection or flange 58 adjacent to an end of which there can be provided a mounting means including an annular shank 59 as well as a dome-like, outwardly-barbed head portion 60 with a recess 61 provided axially into the head portion 60. This recess 61 can accommodate a suitable prong or tool means for insertion and installation of the head portion 60 into an apertured mounting panel and it is to be noted that the solid annular configuration of the head portion and integral shank 59 can provide a peripheral seal of an apertured mounting panel P outlined in FIGURE 7. Use of such a sealing head portion 60 provides closure of the hole or aperture in the mounting panel P so as to dust proof the installation and also avoid passage of water and the like due to weather conditions therethrough.

FIGURES 8 and 9 illustrate a further modification of wiring harness clip means generally indicated by numeral 66 and having a longitudinally extending main body portion 67 provided with transverse ribs 69 and 70 in pairs parallel to each other on opposite sides of a substantially J-shaped flange means 71. This flange means 71 can serve for stabilization of positioning of the clip means 66 and can provide a substantially triangular recess 72 in which a single wire or conductor 73 can be held relative to a mounting panel 74 having an opening or aperture 75 therein as outlined in FIGURE 9. The clip means 66 further includes a cylindrical or barrel-like button portion centrally integral with the body portion 67 to one side thereof as joined by the flange portion 71 therewith. This barrel-like button portion can include an annular shank 76 against which the wire or conductors 73 can abut and a reduced diameter tapered end 77 having radially outwardly projecting serrations or ribbing 78 for press fit into tight engagement with a periphery or edge of the panel 74 defining the aperture 75. It is to be noted that the free end of the flange portion 71 can be flexed away from the mounting panel 74 to permit placement of the wire or conductor 73 after the clip means 66 is fitted to the mounting panel aperture 75. The smooth and cylindrical shank 76 can be urged in sealing engagement with a peripheral edge on one side of the apertured mounting panel depending upon the extent of insertion of the tapered projection 77 through the aperture 75. Located axially in alignment with the shank 76 there is an annular hammering or tool-engaging means 79 centrally recessed for resilience. This central recessing of the tool-engaging means 79 can also accommodate a rod and the like for pushing the clip means 66 into assembled relationship with an apertured panel. A tape-like wrapping 80 can be provided around grouped conductors 81 as outlined in the views of FIGURES 8 and 9 and preferably the conductors 81 are placed on a side of the body portion 67 opposite to the side on which the transverse projections 69—70 are provided. These projections 69—70 are anchors for avoiding possible sliding or longitudinal movement of the conductors 81 relative to the body portion 67 and the tape-like wrapping 80 is adapted to encompass the conductors 81 as well as the body portion 67 and ribs or projections 69—70 therewith. The clip means 66 can thus accommodate a single wire such as 73 free of any tape-like wrapping and adapted for auxiliary mounting of conductors as well as preassembled prepositioning of the clip means 66 relative to a wiring harness including bundled conductors 81. Reference can be made to Patent 2,931,851—Sims belonging to the assignee of the present invention as well as to copending applications Serial No. 145,303—Hopkins and Serial No. 145,396—Kropp, both filed October 16, 1961, and belonging to the assignee of the present invention for further disclosure of plastic clip means for mounting of conductors, conduits and the like adjacent to an apertured mounting panel such as on a motor vehicle.

While the embodiments of the present invention as herein disclosed constitute preferred forms, it is to be understood that other forms might be adopted.

What is claimed is as follows:

1. A wire clip means of moldable plastic material, comprising, a primary body portion recessed to have a longitudinally extending concave surface on one side to receive wiring substantially complementary thereto, a handling extension integral though located predominantly to one side of said primary body portion and also recessed to have a longitudinally extending concave surface in alignment with that of said primary body portion, a secondary body portion adapted to complement only said primary body portion and to form a passage therebetween, hinge means of reduced thickness of plastic material integrally interconnecting said primary and secondary body portions, a barbed lug means integral with said primary body portion in a location laterally remote from said secondary body portion and adapted to fit a mounting panel aperture, and latching means integrally extending from said body portions laterally thereof for interlock therebetween.

2. The clip means of claim 1 wherein said extension has at least one rib adjacent to a free end that serves to maintain predetermined spacing of said body portions and provides access for handling thereof during mounting panel installation and removal of the clip means.

3. The clip means of claim 1 wherein said extension has rib means transversely thereon located opposite said concave surface for maintenance of spacing of a free end of said extension a predetermined distance from a mounting panel for access thereto during handling.

4. The clip means of claim 1 wherein said secondary body portion is substantially L-shaped with a latching lug adjacent to an end thereof spaced from said hinge means and engageable with a flange integral with said primary body portion, said lug and flange together forming said interlock means.

5. A clip means of moldable plastic material such as polypropylene and the like to hold conductor means adjacent to an apertured mounting panel, comprising, a primary body portion concavely recessed on one side to complement a rounded conductor means, a tab-like extension integral longitudinally only to one side of said primary body portion and also recessed concavely in alignment therewith, transverse ribs parallel to each other on a side of said extension opposite to that concavely recessed and adapted for laterally spacing said extension from the mounting panel for handling purposes, barbed lug means integral with said primary body portion in a location laterally away from the side that is concavely recessed and adapted to fit a mounting panel aperture, a secondary generally L-shaped body portion, hinge means of reduced thickness integrally interconnecting said primary and secondary body portions for pivotal movement directly therebetween, a thickened abutment carried by said L-shaped body portion and adapted to engage conductor means in a passage formed between said primary and secondary body portions, a flange projecting laterally from said primary body portion on a side thereof remote from said hinge means, and a latching lug integral with a free end of said L-shaped body portion for interlock with said flange.

6. In a one-piece clip means of moldable plastic material such as polypropylene and the like to hold wiring means adjacent to an apertured mounting panel, improvement in structural arrangement comprising, a primary body portion integrally having a barbed mounting lug means and recessed to have a longitudinally extending concave surfacing on one side to receive wiring means substantially complementary thereto, a tab-like extension integral though located predominantly to one side of said primary body portion and also recessed to have a longitudinally extending concave surfacing in alignment with that of said primary body portion, said extension having at least one rib means transversely thereon located opposite said concave surfacing for maintenance of spacing of a free end of said extension at a predetermined distance from a mounting panel for access and handling during mounting of lug means for panel installation and removal thereof, a substantially L-shaped secondary body portion adapted to complement only said primary body portion defining a passage therebetween in which said wiring means is restrained against longitudinal displacement of said body portions longitudinally of the concave surfacing, hinge means of reduced thickness of plastic material integrally interconnecting said primary and secondary body portions for pivotal movement directly therebetween, a flange projecting laterally from said primary body portion on a side thereof remote from said hinge means, and a latching lug integral with a free end of said L-shaped body portion for interlock with said flange.

References Cited in the file of this patent

UNITED STATES PATENTS

| | | |
|---|---|---|
| 2,931,851 | Sims | April 5, 1960 |
| 2,995,328 | Whitted | Aug. 8, 1961 |
| 2,996,275 | Holton | Aug. 15, 1961 |

FOREIGN PATENTS

| | | |
|---|---|---|
| 599,050 | Great Britain | Mar. 3, 1948 |
| 1,237,836 | France | June 27, 1960 |